April 1, 1969  D. G. ADLER  3,436,629
BALANCED VERTICAL POSITIONING SYSTEM
Filed Oct. 6, 1965
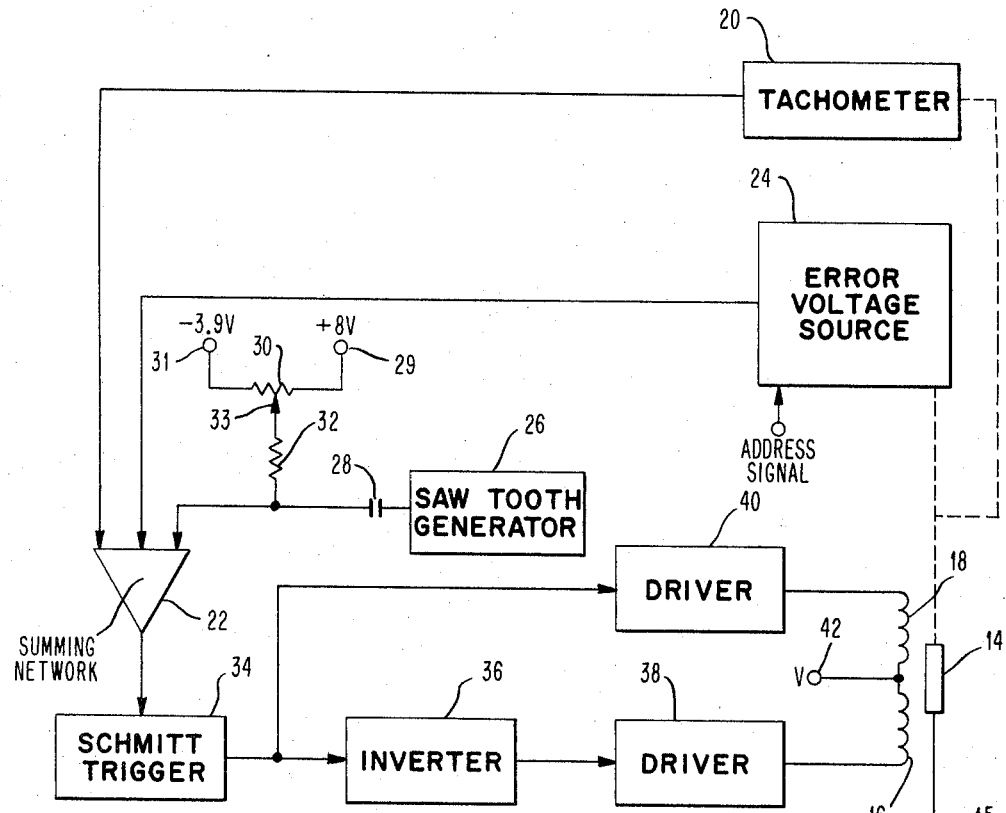
FIG. 1
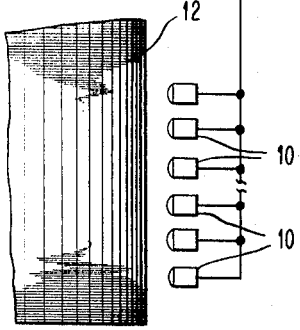
FIG. 2
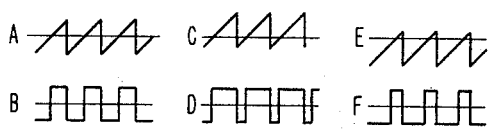
INVENTOR
DAVID G. ADLER
BY Edward M. Farrell
ATTORNEY United States Patent Office 3,436,629
Patented Apr. 1, 1969

3,436,629
BALANCED VERTICAL POSITIONING SYSTEM
David G. Adler, Drexel Hill, Pa., assignor to Sperry Rand Corporation, New York, N.Y., a corporation of Delaware
Filed Oct. 6, 1965, Ser. No. 493,386
Int. Cl. H02p 1/46, 5/28, 7/36
U.S. Cl. 318—22                     2 Claims

ABSTRACT OF THE DISCLOSURE

In order to compensate for the gravitational effect of a transducer which is arranged to move in an upward or downward direction, a bias level is applied to a pulse duration modulator. This enables more current to flow through either one of two coils so that gravitation and weight can be accounted for in the transducer moving mechanism.

---

This invention relates to a positioning system for positioning a transducer over a recording medium, and more particularly to a positioning system wherein the transducer must be moved vertically during the positioning operation.

Various systems have been employed in the past for positioning a transducer over a selected track on a recording medium. While such systems, in the main, have been satisfactory, the speed requirement of modern systems have necessitated further refinements in the positioning systems employed.

In designing a computer system, for example, it is important to know the access time, i.e., the time required for a transducer to ultimately reach its selected position. Very often, the over all design of many components within a computer system will be related to the access time of the transducer.

When a transducer is to be moved horizontally, the access time of the transducer will be substantially the same regardless of the direction in which the transducer is moved. However, when the transducer is to be moved vertically, gravitational forces will tend to affect the access time. For example, all other things being equal, a transducer element will tend to move faster in a down direction then when it is moved in an upward direction. Thus, the access times of the transducer will vary tending to introduce problems into the overall design of a computer system.

In addition to the gravitational forces, the weight of the various mechanical elements involved becomes an important factor. For example, if the various weights are different, the time that it takes the transducer to reach its selected positioin will also be different.

In accordance with the present invention, a transducer is adapted to be moved vertically to a selected track on a recording medium, such as a magnetic drum, which may include a plurality of information tracks. A current through a winding provides a magnetic field to move an element attached to the transducer causing it to move, the direction of movement of the transducer being dependent upon the direction of current through the coil. A saw tooth electrical signal is provided to produce a rectangular shaped signal to be applied to the coil. Means for varying the bias level of the saw tooth electrical signal is provided so that the rectangular shape electrical signal may be varied to provide more or less current through the coil to compensate for gravitational, differences in weight and other mechanical factors.

FIGURE 1 is a schematic diagram, partly in block diagram form, illustrating a positioning system, in accordance with the present invention, and FIGURE 2 illustrates a series of wave forms shown for purposes of explanation.

In many positioning systems, servomechanisms are employed to move a positioning element. In a computer system involving a magnetic drum, a magnetic read or write head is normally positioned over an information track having a designated address. If it is desired to move the magnetic head to a different position or address, an error positioning voltage is generally first developed and applied to a suitable servomechanism to cause movement of the magnetic head to the new selected address. The error positioning voltage is generally the voltage representative of the difference between the actual position of the magnetic head and the position to which the magnetic head is to be moved. This error positioning voltage is generally derived from a comparison of a voltage representing the actual position of the magnetic head and a voltage representative of the position being sought by the magnetic head.

As the magnetic head moves from its previous address toward a new selected address, the error positioning voltage gradually diminishes until its reaches zero voltage, which indicates that the magnetic head is at its selected new address. All of these features relating to positioning a magnetic head are well known to those skilled in the art and therefore will not be shown or described in detail.

It is know in servomechanism that as an element reaches its final position, it will tend to overshoot. This tends to cause a certain amount of oscillation in the system. In order to minimize this effect, a velocity voltage, representative of the speed of movement of the magnetic head is generally developed. This velocity voltage acts as a damping voltage. Generally, the velocity voltage is a voltage of opposite polarity to the error positioning voltage. As the magnetic head approaches its final position the velocity voltage and the error positioning voltage, in combination, generally control the servomechanism which moves the magnetic head. Again, the use of such velocity voltages in combination with error positioning voltages are well known to those skilled in the art. The present invention utilizes the velocity and error positioning voltage in combination with a sawtooth signal to achieve certain advantages in positioning magnetic heads where a high power control signal is needed for application to the prime mover associated with a servo system.

Referring particularly to FIGURE 1, a plurality of transducer elements 10 are adapted to the position over selected information tracks on a magnetic drum 12. A core 14 connected to a rod 15 is adapted to be moved to move the transducers 10 when an electrical current passes through either of the coils 16 or 18. Various circuits are employed to produce a suitable electrical signal in one of the coils 16 or 18 to selectively position the transducer elements.

A tachometer 20 may be employed to produce a voltage representative of the speed of the transducers 10. The output signal from the tachometer 20 is applied to a summing network 22.

A second voltage is applied from a source 24, which represents the error voltage for driving the transducers 10, to the summing network 22. The so-called error voltage may be considered as the difference in voltage between a voltage representing the address being sought by the transducers and a voltage which represents the actual position of the transducers during operation. As the transducers 10 approach the selected position, the error voltage progressively becomes less and eventually reaches zero. At this point, the transducers 10 will be at the desired position.

A third voltage source is a saw-tooth generator 26. The output voltage from the saw-tooth generator 26 is also applied to the summing network 22 through a capacitor 28. A variable resistor 30 and a resistor 32 are used to vary the bias level of the signal from the saw-tooth generator 26, as will be described.

The output signal from the summing network 22 is applied to a Schmitt trigger circuit 34. The Schmitt trigger circuit, being a bistable device capable of switching states each time an applied input signal crosses zero, generates a rectangular shaped electrical signal.

The output signal from the Schmitt trigger circuit 34 is applied to an inverter 36 with the output signal from the inverter being applied to a driver circuit 38. The output signal from the Schmitt trigger circuit 34 is also applied to a driver circuit 40.

The output signal from the driver circuit 38 is applied to the coil 16 to cause current to flow therethrough from a voltage source 42. The output signal from the driver circuit 40 is applied to the coil 18 to cause current to flow therethrough from the voltage source 42. Current will flow in either or the other of the coils 16 or 18 and will flow in opposite directions dependent upon the operating state of the Schmitt trigger circuit 34. Thus current through the coil 16 may cause the core 14 to be moved up. On the other hand, current through the coil 18 will cause the core 14 to be moved down.

Referring particularly to FIGURE 2, the output signal from the saw-tooth generator 26 may be varied to cause different output signals from the Schmitt trigger circuit 34. In considering the present invention, the output signal from the tachometer 20 and the track address circuit 24 will not be considered further in detail. Since the output signals from the saw-tooth generator 26 is primarily directed to the present invention only this particular circuit will be considered.

The output signal from the saw-tooth generator 26 may generate a signal represented by the wave form A. This signal crosses over a reference point or zero at substantially the mid-point of the slope of the signal. Under these conditions, a wave form B will be generated by the Schmitt trigger circuit 34. It is noted that the positive and negative portions of the wave form B are substantially equal. This means that substantially the same amount of current will tend to flow through the coils 16 and 18. Since the currents in the coils 16 and 18 are in opposite directions, the average total current may be zero and the core 14 will not move under normal conditions. However, as previously mentioned, gravitational effects as well as the weights of the various mechanical elements may tend to pull the rod 14 down. Consequently, to maintain the core 14 in a stationary condition, the average current through the coils 16 and 18 must be greater than zero, i.e., the current through the coil 16 must be slightly greater than the current through the coil 18 overcoming the tendency of the core 14 to be moved down by gravitational forces.

The network including the resistors 30 and 32 provides a bias level for the saw-tooth signal. Sources of voltage 29 and 31, connected to positive and negative voltages, respectively, are connected across the resistors 29 and 31. The contact 33 may be varied to any value between the voltages at sources 29 and 31 to provide a reference or bias level. The level may be shifted down so as to produce a signal such as wave form C. A signal such as wave form C, in turn, creates an output signal from the Schmitt trigger circuit 34, as illustrated in waveform D.

In considering waveform D, it is noted that the positive portions of the signal are greater than the negative portions. This will cause current to flow a longer period of time in one of the coils. For example, the current may flow longer through the coil 16 with respect to the current in the coil 18. The greater current in the coil 16 causes the core 14 to be moved upwardly.

In like manner, the bias level for the saw-tooth signal may be raised to produce a signal represented by a waveform E. A signal such as waveform E will produce an output signal from the Schmitt trigger circuit 34 represented by the waveform F.

It is noted that in waveform F that the negative portions of the signals are greater than the positive portions. This means that more current will flow in the coil 18 causing the rod 14 to be pulled downwardly.

Thus it is seen that the present invention as provided is a relatively simple means for compensating for gravitational forces and for different weights in a mechanical positioning system. The invention is especially applicable to systems involving vertical positioning of mechanical elements.

The embodiments of the invention in which an exclusive property or privilege is claimed are defined as follows:

1. In combination with a vertically disposed mechanical element adapted to be moved up and down, a two coil element connected in series, means for applying a modulating electrical signal to said coil element to drive said mechanical element, the direction of movement of said mechanical element being dependent upon the polarity of said electrical signal applied to said coil and the amount of current flowing through each said coil element, a source of saw-tooth electrical signals, a bistable detector circuit capable of assuming high or low output states dependent upon the input signal applied thereto, a source of reference potential, a source of bias voltage for biasing said saw tooth generator so that a portion of said saw tooth signal extends positively and a portion of said saw-tooth signal extends negatively with respect to said bias voltage, means for applying said biased saw-tooth signal to said detector circuit to produce a series of rectangular shaped electrical signals with its output changing states each time said saw-tooth signal crosses said reference potential, and means for fixedly adjusting the level of said bias voltage to vary the positive and negative portions of said saw-tooth signal to compensate for variations in gravitational forces acting on said mechanical element whereby the speed of said mechanical element may be made substantially the same for both up and down movements for the same degrees of modulation.

2. In combination with a vertically disposed mechanical element adapted to be moved up and down, a vertically disposed magnetic drum, a plurality of transducers mounted to said mechanical element disposed to be moved to selected tracks on said drum, a pair of coil elements, means for applying a modulating electrical signal to one or the other of said coil elements to drive said mechanical element, the direction of movement of said mechanical element being dependent upon which coil element receives said electrical signal, a source of saw-tooth electrical signals, a bistable detector circuit capable of assuming high or low output states dependent upon the input signal applied thereto, a source of reference potential, a source of error signals, means for applying said error signal to said detector circuit to shift said reference level potential, a source of bias voltage for biasing said saw-tooth generator so that a portion of said saw-tooth signal extends positively and a portion of said saw-tooth signal extends negatively with respect to said bias voltage, means for applying said saw-tooth signal to said detector circuit to produce a series of rectangular shaped electrical signals with its output changing states each time said saw-tooth signals crosses said reference potential, and means for fixedly adjusting the level of said bias voltage to vary the positive and negative portions of said saw-tooth signal to compensate for variations in gravitational forces acting on said mechanical element whereby the speed of said mechanical element may be made substantially the same for both up and down movements for equal degrees of modulation so that the access time for positioning said transducers to selected tracks on said drums is relatively constant.

References Cited

UNITED STATES PATENTS 2,733,425  1/1956  Williams et al. ___ 318—22 XR
3,003,096  10/1961  Du Bois _____ 318—29 XR
3,213,343  10/1965  Sheheen _____ 318—341
3,260,912  7/1966  Gregory _____ 318—341

BENJAMIN DOBECK, *Primary Examiner.*

U.S. Cl. X.R.

318—28